(12) United States Patent
Lindsay

(10) Patent No.: US 6,626,412 B1
(45) Date of Patent: Sep. 30, 2003

(54) MOUNTINGS FOR OPTICAL APPARATUS

(75) Inventor: Richard Arthur Lindsay, Gislingham (GB)

(73) Assignee: The Vitec Group plc, Suffolk (GB)

( * ) Notice: Subject to any disclaimer, the term of this patent is extended or adjusted under 35 U.S.C. 154(b) by 0 days.

(21) Appl. No.: 09/869,539

(22) PCT Filed: Dec. 29, 1999

(86) PCT No.: PCT/GB99/04441
§ 371 (c)(1),
(2), (4) Date: Sep. 4, 2001

(87) PCT Pub. No.: WO00/39498
PCT Pub. Date: Jul. 6, 2000

(30) Foreign Application Priority Data

Dec. 29, 1998 (GB) ............................................. 9828792

(51) Int. Cl.$^7$ ................................................ F16M 13/00
(52) U.S. Cl. ................. 248/550; 248/180.1; 248/183.2; 248/187.1
(58) Field of Search .............................. 248/550, 187.1, 248/177.1, 179.1, 180.1, 183.2, 186, 418; 348/144, 147; 396/421, 427, 428; 352/243; 267/69, 70, 64.16, 150

(56) References Cited

U.S. PATENT DOCUMENTS

| 3,703,999 A | * 11/1972 | Forys et al. ................. 188/380 |
| 4,546,960 A | * 10/1985 | Abrams et al. .............. 248/550 |
| 5,170,197 A | * 12/1992 | Schmidt et al. ........... 248/186.2 |
| 5,465,924 A | 11/1995 | Schneider ................. 244/118.1 |
| 5,835,193 A | * 11/1998 | Romanoff et al. ........... 352/243 |

FOREIGN PATENT DOCUMENTS

| EP | 0 541 579 | 9/1995 | ............ F16M/11/32 |
| FR | 2640206 | 6/1990 | ............ B60G/23/00 |
| GB | 2 189 042 | 10/1987 | ............ F16M/11/12 |
| WO | 92/02756 | 2/1992 | ............ F16M/11/32 |

OTHER PUBLICATIONS

PCT Search Report for PCT/GB99/04441, filed Apr. 13, 2000.

* cited by examiner

Primary Examiner—Korie Chan
(74) Attorney, Agent, or Firm—Moser, Patterson & Sheridan, L.L.P.

(57) ABSTRACT

The disclosure relates to a mounting for an optical apparatus having an optical axis. The mounting has a base and a support for the optical apparatus which provide movement about one or more orthogonal axes and having damping means between the moving and non-moving components for the or each axis. The mounting further having means to determine movement (θ relative) of the damping means at each moving component as a measure of intended movement of the mounting, means to determine actual movement (α absolute) of the mounting and means responsive to any difference detected between the intended and actual movements to apply a corrective movement to the optical apparatus.

18 Claims, 2 Drawing Sheets

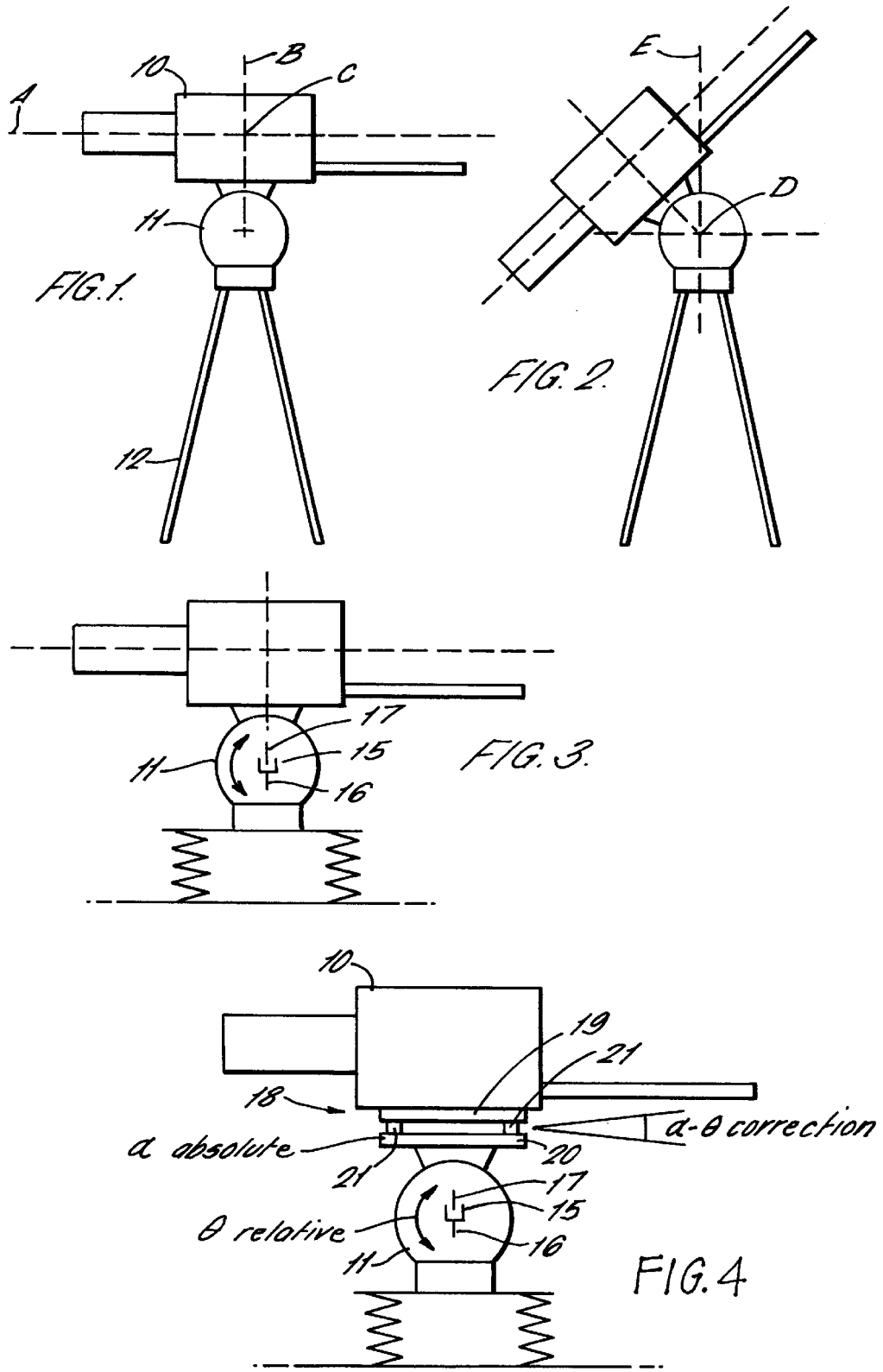

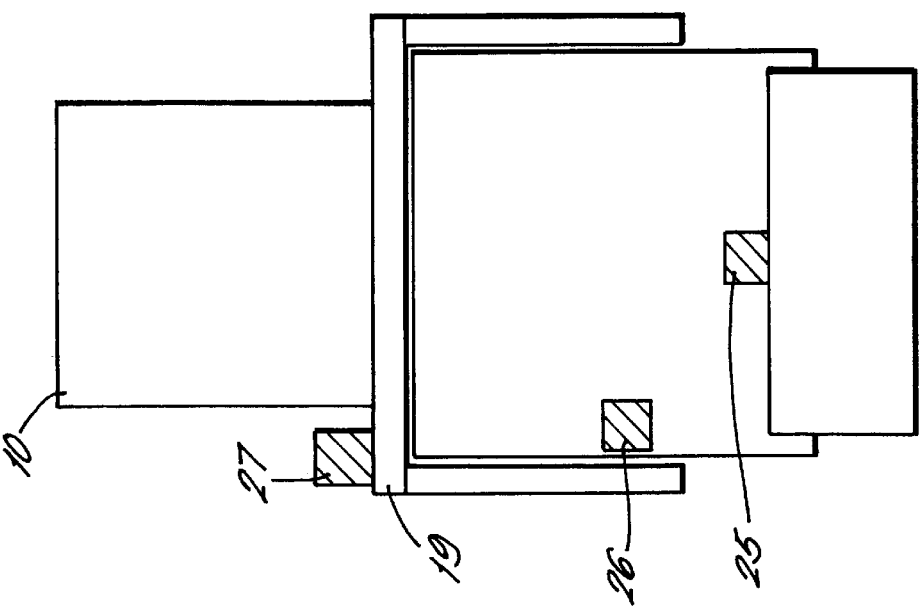
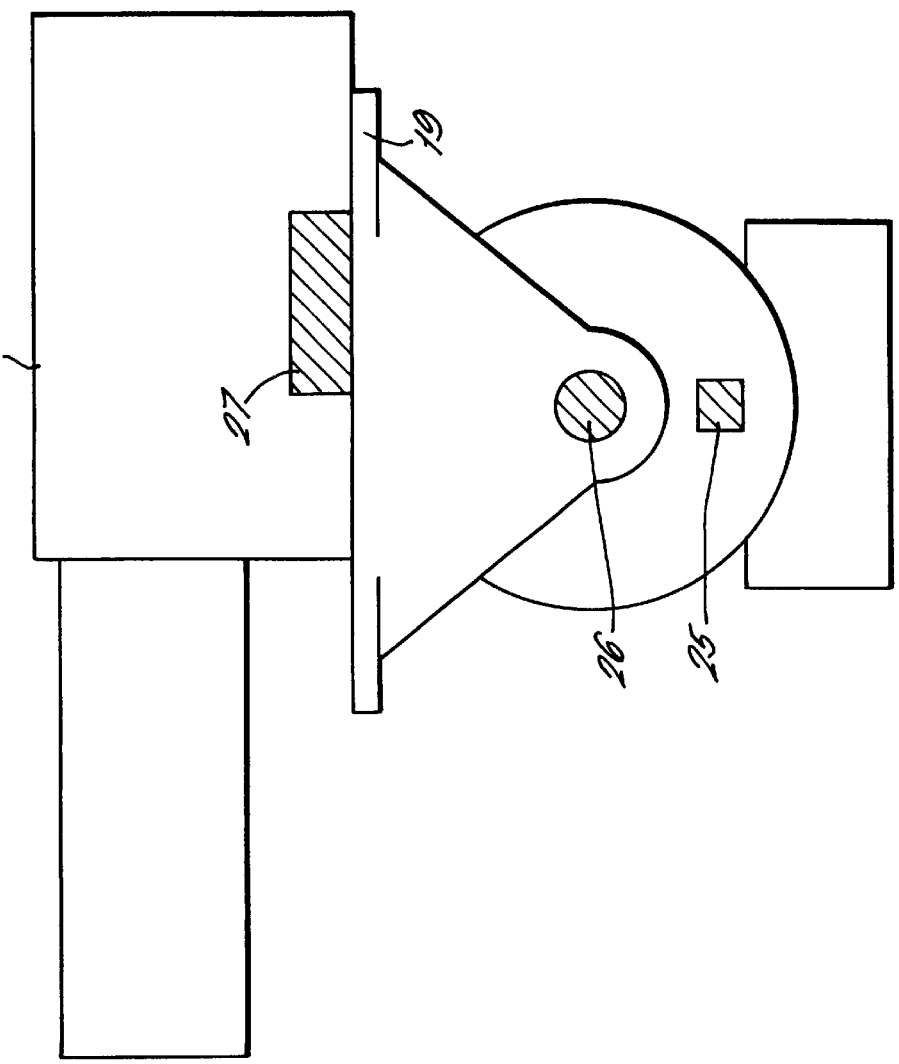

MOUNTINGS FOR OPTICAL APPARATUS

This invention relates to mountings for optical apparatus and in particular to camera mountings for TV, video or cinematograph cameras which provide freedom of movement for the camera in at least one axis (e.g. tilt, pan or roll).

U.S. Pat. No. 5,465,924 discloses an inertial stabilizing system for a platform supported on a carrier, which is moved in a dynamically high-frequency and low-frequency manner, in which a base is arranged between the carrier and the platform which is mounted on the carrier so that it is vibration-insulated in a high-frequency manner via a damping device. On this base the platform is disposed in an adjustably movable manner by at least one control circuit which has an inertial sensor sensing the actual movements of the platform, a controller which forms an adjusting signal from the actual-desired value difference of the platform, and an adjusting device which is controlled by the adjusting signal and acts between the base and the platform. The control circuit has a further sensor which senses the low-frequency motion components of the damping device between the carrier and the base, and a control circuit element connected behind the sensor. For forming the control deviation, the control circuit element reduces the actual desired position difference in accordance with the sensor output signal, thereby considerably improving the interference and guiding behaviour of the control circuit for abrupt changes of the desired value.

This invention provides a mounting for an optical apparatus having an optical axis, the mounting having non-moving and moving components including a base and a support for the optical apparatus which provides movement for the apparatus in a plurality of axes, and damping means between the moving and non-moving components in said axes; wherein first means are provided for measuring the movement between the moving and non-moving parts in said axes to indicate the intended movement of the support, second means are provided for measuring the actual movement of the support in each axis, and further means responsive to the first and second means are provided for determining the differences between the actual and intended camera movements in said axes in which the optical apparatus is movable and applying a correction determined from said differences to the support/optical apparatus.

This invention provides a mounting for an optical apparatus having an optical axis, the mounting having non-moving and moving components including a base and a support for the optical apparatus which provide movement about one or more orthogonal axes and having damping means between the moving and non-moving components for each axis, wherein means are provided for determining the difference between actual and intended movements of the apparatus and applying a correction to the apparatus determined thereby.

More specifically the first means comprise means to determine movement of the damping means at each moving component as a measure of intended movement of the optical apparatus, and the second means comprise means to determine actual movement of the optical apparatus/mounting.

By way of example the means for determining damper movement may comprise displacement transducer means. Thus the displacement transducer means may comprise a potentiometer, an optical encoder or a resolver.

The second means for determining said actual movement may comprise means for determining movement of the support for the optical apparatus in each of said orthogonal axes.

For example the second means for determining actual movement of the support of the mounting may. comprise a movement transducer. The movement transducer may comprise a gyroscope, a velocity transducer or an accelerometer.

Said further means to apply a corrective movement may comprise means to move the optical apparatus support with respect to the rest of the mounting.

Thus the means to move the support with respect to the rest of the mounting may comprise one or more reactors for moving the support in the required axis or axes to adjust the optical apparatus by the requisite amount.

In any of the above arrangements the means to detect any difference between the intended and actual movements and to control application of a corrective movement to the apparatus may comprise a micro-processor.

In a further arrangement according to the invention said means to determine the difference between the actual and intended movements of the apparatus may comprise means to determine the difference from the image as seen by the apparatus.

In the latter arrangement the means to correct the apparatus comprises means for connecting the image as seen by the apparatus.

For example, the means to correct the apparatus may comprise means to move the optical apparatus support with respect to the rest of the mounting.

The following is a description of some specific embodiments of the invention reference being made to the accompanying drawings in which:

FIG. 1 is a side view of a TV camera located on a pan and tilt mounting head supported on a tripod form stand;

FIG. 2 is a similar view to that of FIG. 1 showing the camera in a downwardly tilted altitude;

FIG. 3 is a diagrammatic view of the camera and mounting with a damper for tilt movement of the head and springs representing the resilience provided by the tripod form stand;

FIG. 4 is a similar view to FIG. 3 showing a camera support plate of the mounting head in detail in accordance with one embodiment of the present invention;

FIG. 5 is a similar view of a camera and mounting to that of FIG. 1 showing parts of the control system for the mounting; and FIG. 6 is a rear view of the camera/mounting of FIG. 5.

Referring firstly to FIG. 1, there is shown a TV camera 10 supported on a pan and tilt mounting head indicated at 11 itself mounted on a tripod form stand 12. All movements of the camera can be regarded as taking place in one or more of three mutually orthogonal axes indicated at A, B and C, the axis A being the optical axis of the camera. The pan and tilt mounting head may be generally of the type described and illustrated in our GB Patent Specification No. 2189042 and the stand may be of the form described and illustrated in our European Patent Specification No. 0541579.

The pan and tilt mounting head provides fully counterbalanced and damped tilt movement of the camera about a horizontal axis D and damped pan.movement of the camera about a vertical axis E. A damper for damping tilt movement is illustrated at 15 having a non-moving part 16 coupled to a non-tilting part of the mounting and a moving part 17 coupled to a part of the mounting which rotates with tilting of the mounting. A similar arrangement is provided for monitoring pan movement of the mounting.

The object of the invention is to provide compensation for actual movement of the camera in relation to the intended movement of the camera in any of its axis of movement. It will be appreciated that the mounting for the camera does not provide a totally rigid support and FIG. 3 illustrates the resilience provided by the tripod.

Referring now to FIG. 4, transducers (described later with reference to FIGS. 5 and 6) are coupled to the moving parts of the dampers for pan and tilt movement to determine intended movement imparted to the camera in its tilt and pan movements. The camera mounting 11 has a support plate 18 on which the camera is secured and a velocity transducer, gyroscope or accelerometer is coupled to the mounting plate to measure the actual movement of the plate. The resulting signal is fed to a microprocessor which also receives a signal from the transducer in the damper referred to above. The microprocessor is programmed to determine the difference between the intended and actual movement of the camera and to provide a corresponding adjustment signal.

The mounting plate 18 for the camera comprises upper and lower plates 19, 20, separated by spaced actuator devices 21. The adjustment signal from the microprocessor is fed to the actuators 21 to adjust the position of the upper plate 19 in relation to the lower plate 20 to compensate for the difference between the intended and actual movement of the camera mounting plate 18 and thereby compensate for the unintended movement which would otherwise be transmitted to the camera from the mounting.

The corrections applied by the microprocessor to the camera axes are suitably modified to account for any differences of alignment between the camera axes and the mounting axes.

In the above arrangement, the difference between the intended and actual camera movements and the compensation movement to cater for the difference are detected and applied mechanically. Alternatively the difference between actual and intended movements could be determined from the image recorded by the camera. Also the correction could be applied to the camera optics or to the image recorded by the camera rather than mechanical movement of the camera itself. Thus various combinations of mechanical detection/ connection with image detection/connection can be envisaged. Also the invention is applicable to a wide range of optical instruments in addition to cameras such as telescopes, laser pointers and other such equipment.

Referring now to FIGS. 5 and 6 of the drawings, position or velocity transducers 25 and 26 are shown for determining movement or speed of movement in pan and tilt directions respectively. The transducers may be potentio meters, encoders or tachometers. In addition, a solid state two axis gyroscope 27 is located on the mounting plate 19 to determine absolute movement of the plate in the two axes of measurement. The transducers and gyroscope interface with the microprocess as indicated earlier to provide compensation at the camera or in the image received for the differences between actual and intended camera movement.

What is claimed is:

1. A mounting for an optical apparatus having an optical axis, the mounting having a base and a support for the optical apparatus which provides movement for the apparatus in a plurality of orthogonal axes, and damping means for damping movement of the support; wherein damping means are provided for each of the axes of movement of the suport for damping the movement of the support in each of the respective axes, first measuring means are provided for measuring movement of the support with respect to the base in each axis to provide an indication of intended movement of the support, second measuring means are provided for measuring the actual movement of the support in each axis, and further means are provided responsive to the first and second measuring means for determining the differences between the actual and intended support movements in said axes and for applying a correction determined from said differences to the at least one of the support the optical apparatus carried by the support.

2. A mounting for an optical apparatus as claimed in claim 1, wherein said first means comprise means to determine movement of the damping means at each moving component as a measure of intended movement of the optical apparatus, and the second means comprise means to determine actual movement of the optical apparatus/mounting.

3. A mounting as claimed in claim 2, wherein the means for determining damper movement comprise displacement transducer means.

4. A mounting as claimed in claim 3, wherein the displacement transducer means comprise a potentiometer, an optical encoder or a resolver.

5. A mounting as claimed in claim 1, wherein the second means for determining said actual movement comprise means for determining movement of the support for the optical apparatus in each of said orthogonal axes.

6. A mounting as claimed in claim 5, wherein the second means for determining actual movement of the support of the mounting comprise a movement transducer.

7. A mounting as claimed in claim 6, wherein the movement transducer comprises a gyroscope, a velocity transducer or an accelerometer.

8. An apparatus as claimed in claim 1, wherein said means to determine the difference between the actual and intended movements of the apparatus comprise means to determine the difference from an image as seen by the apparatus.

9. A mounting as claimed in claim 1, wherein said further means to apply a corrective movement comprise means to move the optical apparatus support with respect to the rest of the mounting.

10. A mounting as claimed in claim 9, wherein the means to move the support with respect to the rest of the mounting comprise at least one reactor for moving the support in the required axis or axes to adjust the optical apparatus by the requisite amount.

11. An apparatus as claimed in claims 1, wherein the means to detect any difference between the intended and actual movements and to control application of a corrective movement to the apparatus comprises a microprocessor.

12. An apparatus as claimed in claim 1, wherein the means to correct the apparatus comprises means for correcting the image as seen by the apparatus.

13. An apparatus as claimed in claim 1 for use with a camera having image adjustable optics, wherein the means to correct the apparatus comprise means to apply a correction to said camera optics.

14. A mounting for an optical apparatus (10) having an optical axis, the mounting having non-moving and moving components (16, 17) including a base and a support (18) for the optical apparatus which provides movement for the apparatus in a plurality of axes (D,E), and damping means (15) between the moving and non-moving components for damping movement of said moving components in said axes; characterized in that first means are provided for measuring the movement between the moving and non-moving parts in said axes to indicate intended movement of the support, second means are provided for measuring the actual movement of the support in each axis, and further means (21) responsive to the first and second means are provided for determining the differences between the actual and intended optical apparatus movements in said axes in which the optical apparatus is movable and applying a correction determined from said differences to the support/ optical apparatus; wherein said first means comprise means to determine movement of the damping means (15) at each moving component as a measure of intended movement of the optical apparatus, and the second means comprise means to determine actual movement of the optical apparatus/mounting.

15. A mounting for an optical apparatus (10) having an optical axis, the mounting having non-moving and moving components (16, 17) including a base and a support (18) for the optical apparatus which provides movement for the apparatus in a plurality of orthogonal axes (D,E), and damping means (15) between the moving and non-moving components for damping movement of said moving components in said axes; characterized in that first means are provided for measuring the movement between the moving and non-moving parts in said axes to indicate intended movement of the support, second means are provided for measuring the actual movement of the support in each axis, and further means (21) responsive to the first and second means are provided for determining the differences between the actual and intended optical apparatus movements in said axes in which the optical apparatus is movable and applying a correction determined from said differences to the support/optical apparatus; wherein the second means for determining said actual movement comprise means for determining movement of the support for the optical apparatus in each of said orthogonal axes.

16. A mounting for an optical apparatus (10) having an optical axis, the mounting having non-moving and moving components (16, 17) including a base and a support (18) for the optical apparatus which provides movement for the apparatus in a plurality of axes (D,E), and damping means (15) between the moving and non-moving components for damping movement of said moving components in said axes; characterized in that first means are provided for measuring the movement between the moving and non-moving parts in said axes to indicate intended movement of the support, second means are provided for measuring the actual movement of the support in each axis, and further means (21) responsive to the first and second means are provided for determining the differences between the actual and intended optical apparatus movements in said axes in which the optical apparatus is movable and applying a correction determined from said differences to the support/optical apparatus; wherein said means to determine the difference between the actual and intended movements of the apparatus comprise means to determine the difference from an image as seen by the apparatus.

17. A mounting for an optical apparatus having an optical axis, the mounting having a base and a support for the optical apparatus which provides movement for the apparatus in a plurality of orthogonal axes, and damping means for damping movement of the support; wherein damping means are provided for each of the axes of movement of the support for damping the movement of the support in each of the respective axes, first measuring means are provided for measuring movement of the support with respect to the base in each axis to provide an indication of intended movement of the support, second measuring means are provided for measuring the actual movement of the support in each axis, and further means are provided responsive to the first and second measuring means for determining the differences between the actual and intended support movements in said axes and for applying a correction determined from said differences to the at least one of the support or the optical apparatus carried by the support, wherein said first means comprise means to determine movement of the damping means at each moving component as a measure of intended movement of the optical apparatus, and the second means comprise means to determine actual movement of the optical apparatus/mounting.

18. A mounting for an optical apparatus having an optical axis, the mounting having a base and a support for the optical apparatus which provides movement for the apparatus in a plurality of orthogonal axes, and damping means for damping movement of the support; wherein damping means are provided for each of the axes of movement of the support for damping the movement of the support in each of the respective axes, first measuring means are provided for measuring movement of the support with respect to the base in each axis to provide an indication of intended movement of the support, second measuring means are provided for measuring the actual movement of the support in each axis, and further means are provided responsive to the first and second measuring means for determining the differences between the actual and intended support movements in said axes and for applying a correction determined from said differences to the at least one of the support or the optical apparatus carried by the support, wherein the second means for determining said actual movement comprise means for determining movement of the support for the optical apparatus in each of said orthogonal axes, wherein the second means for determining actual movement of the support of the mounting comprise a movement transducer, wherein the movement transducer comprises a gyroscope, a velocity transducer or an accelerometer.

* * * * *